US010517423B2

(12) United States Patent
Tonelli et al.

(10) Patent No.: US 10,517,423 B2
(45) Date of Patent: Dec. 31, 2019

(54) MULTI-FUNCTIONAL JUG AND BEVERAGE PRODUCING MACHINE USING SAME

(71) Applicant: KONINKLIJKE PHILIPS N.V., Eindhoven (NL)

(72) Inventors: Stefano Tonelli, Gaggio Montano (IT); Romeo Mattioli, Lizzano in Belvedere (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/427,109

(22) PCT Filed: Sep. 26, 2013

(86) PCT No.: PCT/IB2013/058883
§ 371 (c)(1),
(2) Date: Mar. 10, 2015

(87) PCT Pub. No.: WO2014/053963
PCT Pub. Date: Apr. 10, 2014

(65) Prior Publication Data
US 2015/0238042 A1 Aug. 27, 2015

Related U.S. Application Data

(60) Provisional application No. 61/710,066, filed on Oct. 5, 2012.

(51) Int. Cl.
A47J 31/44 (2006.01)
A47J 43/044 (2006.01)
A47J 31/46 (2006.01)

(52) U.S. Cl.
CPC ........... A47J 31/4403 (2013.01); A47J 31/46 (2013.01); A47J 43/044 (2013.01); A47J 2043/04454 (2013.01)

(58) Field of Classification Search
CPC .. A47J 31/0449; A47J 31/4489; A47J 31/044; A47J 31/46; A47J 31/462; A47J 31/465; A47J 31/467; A47J 31/4403
(Continued)

(56) References Cited

U.S. PATENT DOCUMENTS 258,777 A * 5/1882 Leonard .................. A24F 19/06
220/501
RE24,323 E * 5/1957 Melville ............... A47J 43/044
219/433
(Continued)

FOREIGN PATENT DOCUMENTS

CN 202269902 U 6/2012
EP 1901638 A1 3/2008
(Continued)

OTHER PUBLICATIONS

Office Action issued in connection with corresponding 2015-535138, dated Sep. 1, 2015, 4 pages.
(Continued)

Primary Examiner — Ibrahime A Abraham
Assistant Examiner — John J Norton
(74) Attorney, Agent, or Firm — Schott, P.C.

(57) ABSTRACT

A jug for preparation of beverages includes a body with a first receptacle and a second receptacle for receiving ingredients for the preparation of the beverages. A first stirrer can be arranged in the first receptacle. The jug also includes a cover closing the body of the jug. A first fluid connection is arranged for receiving a beverage from a beverage producing machine and collecting the beverage in the first receptacle. A second fluid connection to a beverage producing machine is further provided, which is in fluid communication with the second receptacle. The first receptacle and the second receptacle have different depths, where one of the
(Continued)

first receptacle and the second receptacle has a larger depth than the other.

20 Claims, 11 Drawing Sheets

(58) Field of Classification Search
USPC .......................................... 222/144.5, 145.1
See application file for complete search history.

(56) References Cited

U.S. PATENT DOCUMENTS

| | | | | |
|---|---|---|---|---|
| 3,076,573 A * | 2/1963 | Thomas | B65D 47/265 | 215/313 |
| 3,211,343 A * | 10/1965 | Silver | B65D 83/68 | 222/144.5 |
| 3,261,494 A * | 7/1966 | Walker, Jr. | A47G 19/2205 | 215/6 |
| 3,269,605 A * | 8/1966 | Silver | B65D 83/68 | 222/135 |
| 4,378,078 A * | 3/1983 | Daniels | A47J 31/404 | 222/183 |
| 4,651,900 A * | 3/1987 | Horvath | A47G 19/12 | 215/6 |
| 4,703,686 A * | 11/1987 | Siegfried | A47J 31/40 | 99/279 |
| 4,745,852 A * | 5/1988 | Sager | A47J 31/007 | 99/280 |
| 4,750,644 A * | 6/1988 | Kolody | A47G 19/12 | 222/144.5 |
| 4,754,122 A * | 6/1988 | Coppier | A47J 27/2105 | 219/432 |
| 4,773,563 A * | 9/1988 | Taylor | A47G 19/12 | 222/144.5 |
| 4,802,406 A * | 2/1989 | Bouldin | A47G 19/12 | 215/396 |
| 4,809,884 A * | 3/1989 | Stackhouse | B67D 1/045 | 222/153.04 |
| 4,919,295 A * | 4/1990 | Hitzler | B65D 81/3216 | 220/23.83 |
| 4,921,174 A * | 5/1990 | Okada | A47J 43/046 | 241/282.1 |
| 5,072,858 A * | 12/1991 | Brashier | A47G 19/12 | 222/144.5 |
| 5,265,767 A * | 11/1993 | Gustafson | A47G 19/12 | 222/144.5 |
| 5,335,589 A * | 8/1994 | Yerves, Jr. | A47G 19/14 | 215/6 |
| 5,335,813 A * | 8/1994 | Qi | B65D 81/3216 | 220/23.83 |
| 5,405,030 A * | 4/1995 | Frazier | A47G 19/2205 | 215/6 |
| 5,609,194 A * | 3/1997 | Link | A47G 19/12 | 141/331 |
| 5,638,740 A * | 6/1997 | Cai | A47J 31/0657 | 261/126 |
| 5,671,503 A * | 9/1997 | Uebelacker | A47G 19/2266 | 16/111.1 |
| 5,779,102 A * | 7/1998 | Smith | A47G 19/12 | 222/144.5 |
| 5,855,163 A * | 1/1999 | DeMars | A47G 19/12 | 219/448.17 |
| 5,894,952 A * | 4/1999 | Mendenhall | A47G 19/2272 | 215/230 |
| 5,952,028 A * | 9/1999 | Lesser | A23F 5/26 | 206/0.5 |
| 5,992,677 A * | 11/1999 | Ebine | B65D 77/24 | 220/505 |
| 6,079,586 A * | 6/2000 | Hanneman | B65D 43/0212 | 206/217 |
| 6,086,240 A * | 7/2000 | Murphy | A47G 19/22 | 366/147 |
| 6,092,647 A * | 7/2000 | Yeh | A47G 19/2227 | 206/217 |
| 6,585,403 B2 * | 7/2003 | Krall | A47J 43/082 | 366/129 |
| 7,002,108 B1 * | 2/2006 | Chang | A47J 37/1261 | 219/430 |
| 7,637,205 B2 * | 12/2009 | Greiwe | A47J 31/007 | 141/279 |
| 7,740,153 B2 * | 6/2010 | Gustafson | A47G 19/14 | 220/543 |
| 7,784,635 B2 * | 8/2010 | Luburic | B65D 1/24 | 220/505 |
| D653,896 S * | 2/2012 | Wilt | | D7/315 |
| 2001/0052293 A1 * | 12/2001 | Lang | A47J 31/00 | 99/280 |
| 2004/0196736 A1 * | 10/2004 | Bordan | A47J 36/165 | 366/286 |
| 2004/0237798 A1 | 12/2004 | Payne | | |
| 2005/0259508 A1 * | 11/2005 | Rohde | A47J 31/4489 | 366/102 |
| 2006/0070529 A1 * | 4/2006 | Kim | A47J 27/004 | 99/348 |
| 2006/0278091 A1 * | 12/2006 | Rutigliano | A47J 31/007 | 99/279 |
| 2007/0297281 A1 * | 12/2007 | Saunders | A47J 43/044 | 366/251 |
| 2008/0008806 A1 * | 1/2008 | Boussemart | A47J 43/042 | 426/519 |
| 2008/0314255 A1 * | 12/2008 | Lee | A47J 31/057 | 99/280 |
| 2009/0007802 A1 * | 1/2009 | Taitler | A47J 43/044 | 99/453 |
| 2009/0127263 A1 * | 5/2009 | Hylton | A47G 19/2272 | 220/507 |
| 2009/0266240 A1 * | 10/2009 | Elissen | A47J 27/004 | 99/323.3 |
| 2010/0307346 A1 * | 12/2010 | Menashes | F22B 1/282 | 99/323.3 |
| 2011/0089180 A1 * | 4/2011 | Kolbasi | A47J 41/0027 | 220/592.27 |
| 2012/0000372 A1 * | 1/2012 | Vanni | A47J 31/4489 | 99/323.1 |
| 2012/0007260 A1 * | 1/2012 | Lin | A47J 36/165 | 261/142 |
| 2013/0000490 A1 * | 1/2013 | De'Longhi | A47J 43/0465 | 99/323.1 |
| 2013/0026185 A1 * | 1/2013 | Horvath | A47G 19/12 | 222/144.5 |
| 2013/0206013 A1 * | 8/2013 | De' Longhi | A47J 31/40 | 99/293 |
| 2013/0239819 A1 * | 9/2013 | Giua | A47J 31/4489 | 99/291 |
| 2014/0072689 A1 * | 3/2014 | Ho | A47J 31/0605 | 426/569 |

FOREIGN PATENT DOCUMENTS

| | | |
|---|---|---|
| EP | 2186456 A1 | 5/2010 |
| EP | 2198762 A1 | 6/2010 |
| WO | 2006136268 A1 | 12/2006 |
| WO | 2011064702 A1 | 6/2011 |
| WO | 2011113700 A1 | 9/2011 |
| WO | 2011151871 A1 | 12/2011 |
| WO | 2012069991 A1 | 5/2012 |

OTHER PUBLICATIONS

Office Action issued in connection with corresponding 201380047106.0, dated Dec. 30, 2015, 7 pages.

Office Action issued in connection with corresponding 13805531.4, dated Feb. 5, 2016, 4 pages.

English Translation and Notice of Allowance issued in connection with corresponding application No. 2015-535138 dated Nov. 12, 2015, 5 pages.

(56) References Cited

OTHER PUBLICATIONS

English Translation and Notice of Allowance issued in connection with corresponding application No. 2015111683 dated Sep. 7, 2017, 16 pages.

* cited by examiner

MULTI-FUNCTIONAL JUG AND BEVERAGE PRODUCING MACHINE USING SAME

CROSS-REFERENCE TO PRIOR APPLICATIONS

This application is the U.S. National Phase application under 35 U.S.C. § 371 of International Application No. PCT/IB2013/058883, filed on Sep. 26, 2013, which claims the benefit of 61/710,066, filed on Oct. 5, 2012. These applications are hereby incorporated by reference herein.

TECHNICAL FIELD

The present invention concerns improvements to jugs or containers for the preparation of beverages, as well as to beverage producing machines and systems.

BACKGROUND ART

Several beverage producing machines and systems are known, which use jugs for the preparation of special beverages, in combination with dispensing spouts or nozzles provided on the machine, for example for dispensing coffee directly in a cup. Depending upon the kind of beverage to be produced, jugs are known having different shapes and arrangements, for example to produce frothed milk, instant hot beverages, cold coffee and so on.

WO 2006/136268 discloses a coffee machine provided with a set of different jugs, each one suitable for the preparation of a kind of beverage and which can be used in combination with the coffee machine. The coffee machine is provided with a steam nozzle, which can be connected to the jug to dispense steam or hot water in the jug for various purposes. In order to increase the flexibility of the coffee machine, several different jugs are required, said jugs occupying a large amount of space and requiring a special housing.

EP 2186456 discloses a device for preparing shaken beverages, in particular cold shaken coffee. In one of the embodiments disclosed therein, this known device comprises a coffee preparing unit, which can be selectively connected to a coffee dispensing spout and to a shaker. The shaker can be introduced in the machine and a blade rotatingly arranged therein can be put into rotation by means of a motor arranged in the bottom of the coffee machine. The blades are used to crush ice cubes placed in the shaker in order to produce cold coffee.

This known machine is designed only for the preparation of two different beverages, namely hot coffee or cold, shaken coffee, respectively.

SUMMARY OF THE INVENTION

According to the invention, a jug for the preparation of beverages is provided, comprising:
a body with at least a first receptacle and a second receptacle for receiving ingredients for the preparation of beverages;
at least a first stirrer designed and configured to be arranged in the first receptacle or in the second receptacle;
a cover closing the body;
a first fluid connection to a beverage producing machine, arranged for receiving a beverage from the beverage producing machine and collecting said beverage in the first receptacle;
a second fluid connection to a beverage producing machine, in fluid communication with the second receptacle.

The two receptacles and at least one stirrer arranged in one of the receptacles provide for improved flexibility of the jug. The two receptacles can be used selectively or in combination, to prepare a wide variety of beverages, such as e.g. hot and cold cappuccino, hot and cold instant beverages, fresh brew coffee, instant coffee, milk-coffee, iced coffee, espresso, hot chocolate and many others.

According to a preferred embodiment, a second stirrer is provided. The first stirrer and the second stirrer can be mounted on the jug and positioned in the first receptacle and in the second receptacle, respectively. The stirrers are preferably detachable from the jug. For example they can be selectively connected to or disconnected from the cover of the jug. Depending upon the user's need, just one or both stirrers can be connected to the jug. The user can therefore decide whether to use the first stirrer, the second stirrer or both. If just one stirrer is used, the other does not need to be connected to the jug.

In some embodiments the second fluid connection to the beverage producing machine can be configured and arranged for receiving hot water or steam from the beverage producing machine. Hot water can be used to prepare a hot beverage, such as tea, or any instant beverage. The respective stirrer can be used for improved dilution of the granular or solid ingredients. Steam can be used alternatively to hot water for heating a cold liquid contained in the receptacle such as water or milk. Delivery of steam in combination with a rotary movement of the stirrer can be used to produce hot frothed milk, for example. Cold frothed milk can also be prepared with the same jug by pouring milk in the receptacle and activating the stirrer without feeding steam therein.

In exemplary embodiments, therefore, the first receptacle is in fluid communication with the first fluid connection, so that the beverage produced by the beverage producing machine is dispensed in the first receptacle. The second receptacle is in fluid communication with the second fluid connection, for receiving steam or hot water from the beverage producing machine.

In preferred embodiments, the first and/or the second fluid connections can be supported by the cover of the jug. In some embodiments, the first stirrer and the second stirrer are supported by the cover as well. This makes use of the jug simpler and facilitates cleaning of the various parts of the jug. Arranging the first and/or the second stirrer on the bottom of the respective receptacle is not excluded, as an alternative embodiment.

The first stirrer and the second stirrer can be provided with suitable driving devices. In some embodiments the jug can include an electric motor arrangement provided on the jug, e.g. supported by or integrated in the jug cover. This is particularly suitable when the stirrers are supported by the cover. In other embodiments, the motor arrangement can be located in the beverage producing machine, and a mechanical link between the motor arrangement and the stirrers can be provided on the jug. Providing the motor arrangement in the jug cover, however, makes the design simpler, more robust and less expensive. If the stirrers are located on the bottom of the jug receptacles, a motor arrangement can be placed in the body of the jug or else in a housing provided in a base of the beverage producing machine. Magnetic transmission means can be provided between the motor arrangement and the stirrers.

Each stirrer can be provided with its own motor. In other embodiments, the electric motor arrangement comprises a single electric motor driving into rotation both the first stirrer and the second stirrer. A mechanical link, for example a pulley-belt arrangement, can be provided for transmitting the rotary motion to both stirrers. Use of a single electric motor makes the jug more compact, less expensive and more reliable.

The electric motor arrangement provided on the jug can be powered by means of electric contacts arranged in a suitable position on the jug, e.g. on the jug body or preferably on the jug cover. The electric contacts are preferably configured and arranged to co-act with contacts provided on the machine side so that powering of the motor is only possible when the jug is correctly connected to the beverage producing machine.

In some embodiments, the electric contacts and the first and/or the second fluid connection are arranged adjacent to one another for co-action with nozzles and electric contacts arranged for example in a niche or recess provided on the beverage producing machine. In advantageous embodiments, the recess or niche can be provided in a front panel of the machine. For example, the jug cover can be provided with a nose or projection on which the fluid connections and the electric contacts are arranged.

In some embodiments the first stirrer and the second stirrer are preferably detachable from the cover for cleaning purposes. A fast mechanical connection, e.g. a snap connection, can be provided for easy engagement and disengagement of the stirrers to and from the cover and more specifically to and from driving means, such as rotary shafts, supported by the jug cover.

To further improve the flexibility of the jug and making it easy to handle, in some embodiments the jug comprises a channel for introducing a liquid in one of said first receptacle and second receptacle, e.g. in the second receptacle, where steam or hot water can be dispensed through the second fluid connection. It is thus possible for a user to pour a liquid, e.g. milk, in the second receptacle and then activate the beverage producing machine to dispense hot water or steam to heat the liquid, e.g. to produce hot milk or frothed hot milk.

In advantageous embodiments the channel is formed in the jug cover. In particularly advantageous embodiments the jug cover can comprise a removable upper portion, closing an inlet aperture of the channel. To improve easy access by the user, in some embodiments the inlet aperture of the channel is arranged on top of a handle.

The first and second stirrers can be different from one another. E.g. a longer stirrer can be used to mix an instant beverage, or coffee and ice cubes to produce iced coffee or the like, i.e. in those cases where the stirrer is advantageously located with the active portion thereof near the bottom of the receptacle. A shorter stirrer can be used in those instances where it is required to locate the active portion of the stirrer at or near the free surface of a liquid substance contained in the receptacle. For example in order to froth hot or cold milk the stirrer should be located at or near the free surface of the milk, so that rotation of the stirrer causes air bubbles to be trapped in the milk so that air and milk are emulsified forming the froth.

In some particularly advantageous embodiments, two identical stirrers are provided. This makes use of the jug easier and more user-friendly. It also simplifies manufacturing of the jug, since a smaller number of different components are required. In order to obtain different actions of the stirrers in the receptacles, the first receptacle and the second receptacle can have different depths, one of said first receptacle and second receptacle being deeper than the other. The two identical stirrers will then take different positions with respect to the bottom of the respective receptacle wherein they are arranged.

The body of the jug can be provided with a pouring lip, arranged and configured for pouring a beverage from both the first receptacle and the second receptacle. In some embodiments the pouring lip can be in fluid communication with both the first receptacle and the second receptacle, so that beverages simultaneously prepared in the two receptacles can be poured simultaneously. For example the pouring lip can be provided with an intermediate partition wall, dividing the pouring lip in a first portion and a second portion, the first portion and the second portion being arranged for receiving a beverage from the first receptacle and the second receptacle, respectively.

In particularly advantageous embodiments the cover comprises: a lower portion, engageable to the body of the jug; an intermediate portion, engageable to and disengageable from the lower portion, the intermediate portion supporting the first stirrer and the second stirrer; and an upper removable portion. The motor(s) for driving the stirrers can advantageously be housed in the intermediate portion of the cover. The lower portion of the cover can be provided with passages or apertures through which the stirrers are introduced for connection to the motor arrangement housed in the intermediate portion of the cover. When a channel is provided for pouring a liquid in one of the receptacles the channel can advantageously be formed in the lower portion of the cover. The lower and intermediate portions of the cover can together form a passage towards the first receptacle.

In some embodiments, the cover of the jug can be provided with an apertured wall, which is tiltable with respect to the cover and is resiliently biased in a rest position, in the rest position the apertured wall extending across a passage formed in the cover. The passage is arranged for introducing ingredients in the jug. The apertured wall is configured and arranged for tilting inwardly towards the interior of the jug body against an elastic member which biases the apertured wall in the rest position. Solid ingredients, for example ice cubes, can be introduced in the receptacle by tilting the apertured wall. The latter retains possible solid residues, preventing them from being poured from the jug.

According to a further aspect, a beverage producing system is provided, comprising:
 a beverage producing machine comprising:
 a beverage producing unit,
 a beverage dispenser, arranged for dispensing the beverage in a cup arranged under the beverage dispenser,
 a beverage outlet nozzle, arranged for dispensing the beverage in a jug connected to the beverage outlet nozzle and
 a switching member, for fluidly connecting the beverage producing unit selectively to the beverage dispenser or the beverage outlet nozzle;
 and a jug as described above.

Further features and advantages of the invention are set forth in the following description of exemplary embodiments thereof and in the enclosed claims, which form an integral part of the present description.

BRIEF DESCRIPTION OF THE DRAWINGS

A more complete appreciation of the invention and many of the advantages thereof will be readily obtained as the same becomes better understood by reference to the following detailed description when considered in connection with the accompanying drawings, which show one exemplary non-limiting embodiment of the invention. In the drawings.

DESCRIPTION OF EMBODIMENTS OF THE INVENTION

The following detailed description of exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 3:
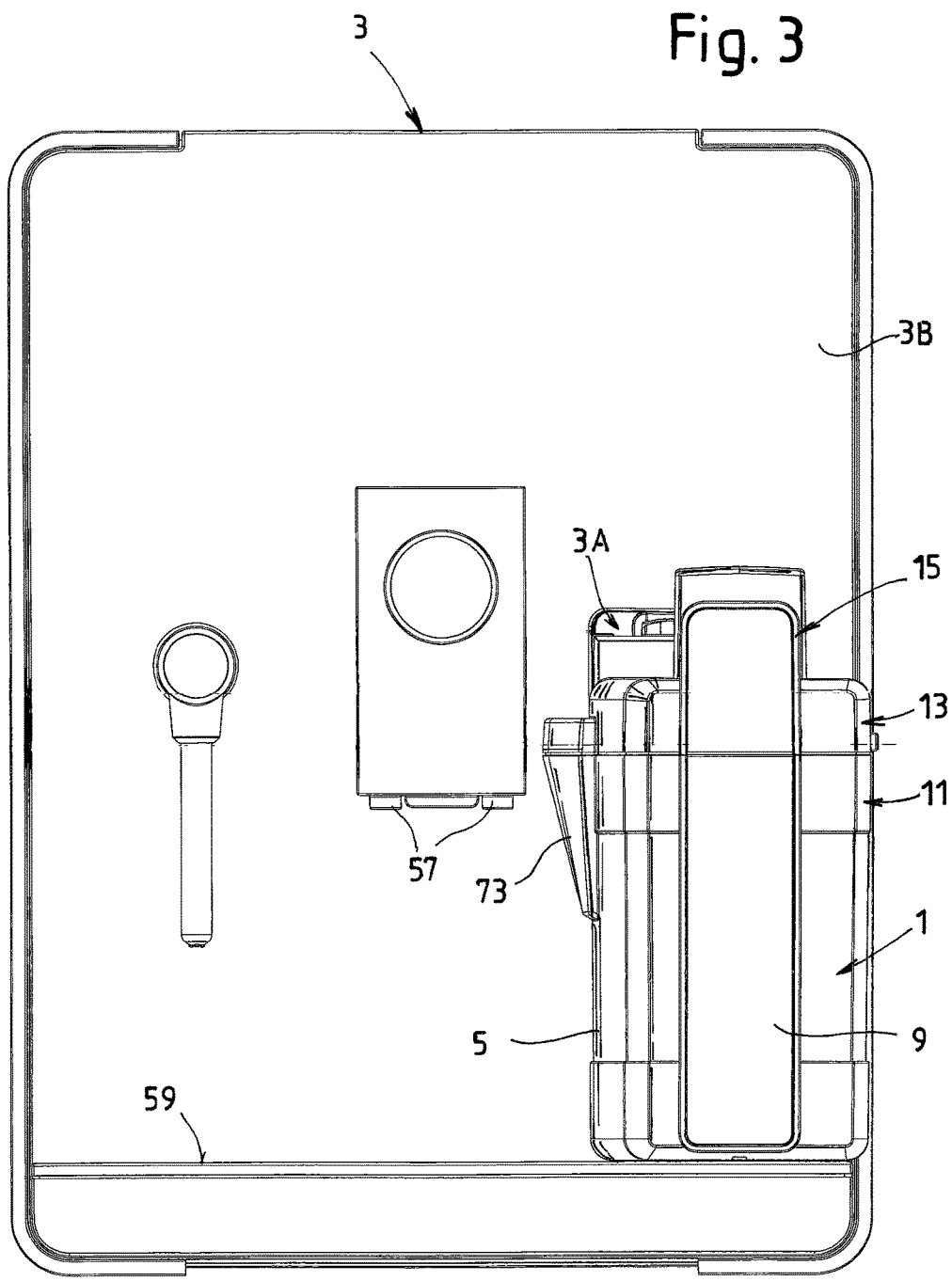
FIG. 3 schematically illustrates a beverage producing machine combined with a jug.

In the annexed drawings, the jug is labeled 1 as a whole and is designed for connection to a beverage producing machine, for example a coffee producing machine, a cappuccino maker, or the like. FIG. 3 schematically illustrates a system comprising a beverage producing machine 3, to which the jug 1 is connected, the front panel of the machine 3 being shown in FIG. 4.

The jug 1 comprises a jug body 5 and a jug cover 7, which is comprised of several components that will be described in more detail later on. The jug 1 further comprises a jug handle 9.

Figure 1:
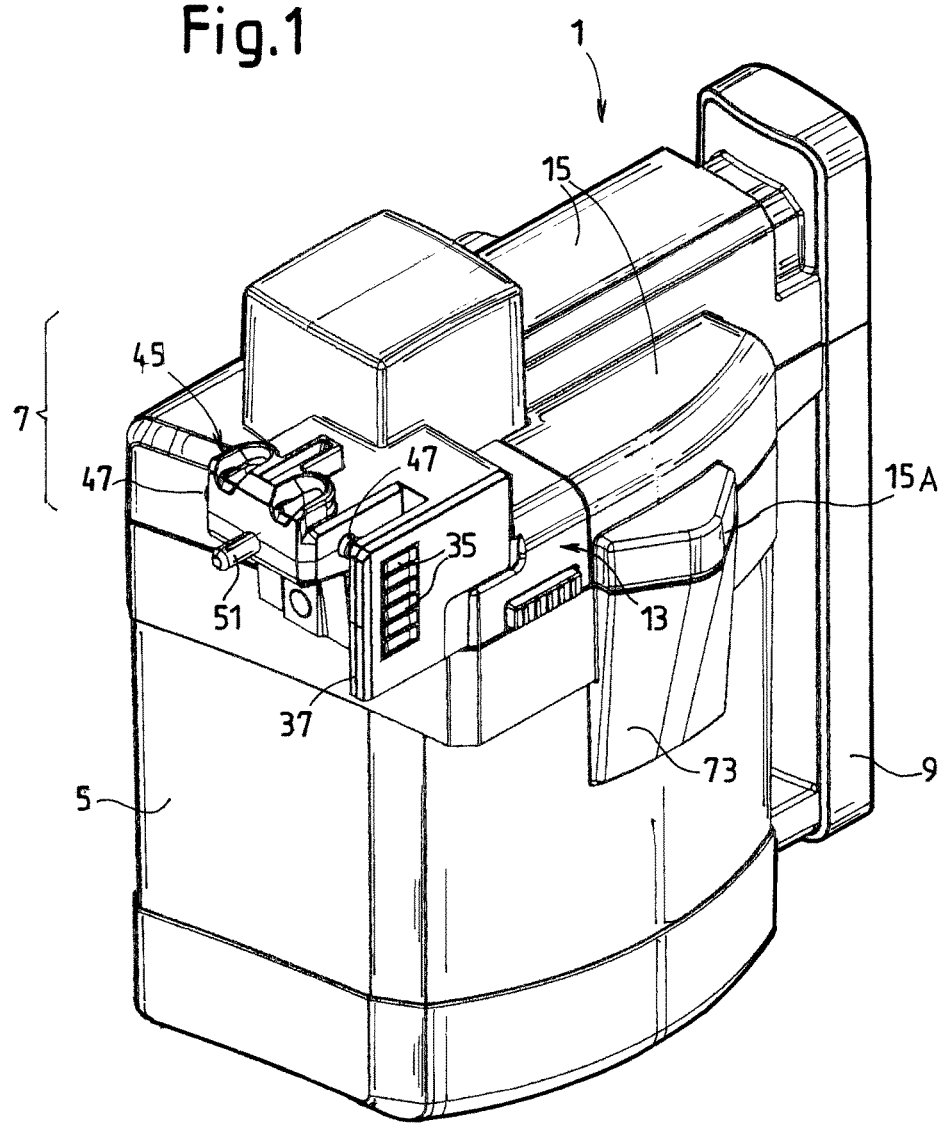
FIG. 1 illustrates a perspective view of a jug according to the present disclosure, in a first embodiment.
Figure 2:
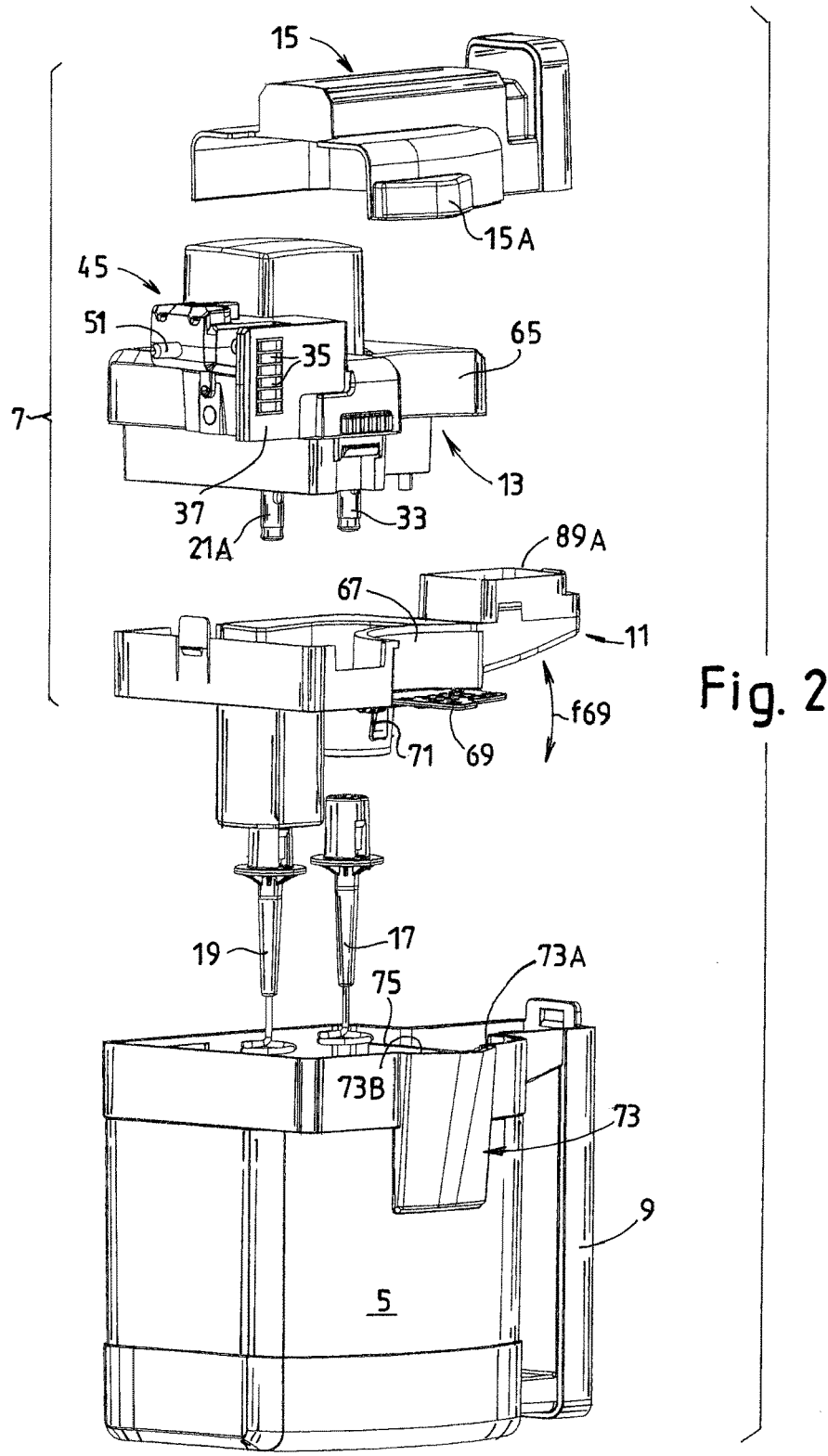
FIG. 2 illustrates an exploded view of the jug of FIG. 1.

As best shown in FIG. 2, the cover 7 of jug 1 comprises a lower portion 11, an intermediate portion 13 and a top portion 15. As will be explained in greater detail here below, the lower portion 11 can be snap-engaged to the body 5 of the jug 1 and comprises passages for a pair of stirrers 17 and 19, which are supported for rotation on the intermediate cover portion 13. The stirrers can be designed and configured to be easily connected to and disconnected from the cover portion 13. For example, a bayonet-type connection can be provided. The user an selectively connect only one stirrer, or both stirrers or neither the first nor the second stirrer to the jug depending upon the kind of beverage he wishes to produce.

In other embodiments, the two stirrers can be connected in a different manner to the jug. For example, they can be arranged on the bottom of the receptacles. For instance, the stirrers could in this case be rotated by motor means arranged in the beverage producing machine through magnetic driving members.

In some embodiments, when the stirrers are supported by the cover of the jug, the cover portion 13 also houses a motor 21 (see for example FIG. 6) for rotation of the two stirrers 17 and 19. In other embodiments, not shown, two different motors can be provided to drive the two stirrers. In other embodiments, a different mover or movers can be used to rotate the stirrers, e.g. a shaft mechanically connectable with a motor housed in the beverage producing machine.

The body 5 of the jug can be internally provided with two receptacles, namely a first receptacle 23 and a second receptacle 25. The shape and arrangement of the two receptacles 23 and 25 is such that the first stirrer 17 is introduced in the first receptacle 23 and the second stirrer 19 is introduced in the receptacle 25 when the jug with the cover 7 mounted thereon is in the assembled condition (FIGS. 1, 5 to 10).

The two receptacles 23 and 25 can be separated by a partition wall 24. As shown in the exemplary embodiment illustrated in the drawings, the two receptacles can have different depths. For example, the second receptacle 25 can be deeper than the first receptacle 23, i.e. the bottom 25B of receptacle 25 is placed in a position lower than the bottom 23B of the first receptacle 23 when the jug 1 is placed in a vertical position, ready for use.

The two stirrers 17 and 19 can be identical to one another, as shown in the embodiment. In other embodiments the two stirrers can be different from one another. In yet further embodiments (not shown) a set of more than two stirrers can be provided, differing in shape and function, so that by selecting one stirrer or stirrer pair or another stirrer or stirrer pair 17, 19 different ingredients can be mixed and/or different beverages can be produced with the same jug.

Having two identical stirrers 17, 19 more user-friendly, since the user does not have to select a specific stirrer for the specific receptacle 23 and 25 and/or for a specific beverage.

In some embodiments, as shown in the drawings, a single electric motor 21 is housed in the cover 7, preferably in the intermediate portion 13 thereof. The stirrer 19 is for example connected directly to a motor shaft 21A of the electric motor 21. A mechanical transmission can be provided in the cover 7 for transmitting the rotary motion from the motor shaft 21A to the other stirrer 17. In some embodiments (see in particular FIG. 8) the mechanical transmission can comprise a toothed wheel 27. The toothed wheel 27 is mounted on motor shaft 21A to rotate therewith. A second toothed wheel 29 and a toothed belt 31 can be provided for transmitting the rotary motion from the first toothed wheel 27 to the second toothed wheel 29. The latter mounted on a shaft 33 and rotates therewith, to rotate the first stirrer 17.

Other mechanical links can be used instead of a pulley-belt transmission. For example, a gear transmission could be suitable in some cases.

The intermediate portion 13 of cover 7 supports a plurality of electric contacts 35, at least some of which are arranged and configured for powering the motor 21. In an exemplary embodiment, the electric contacts 35 can be located on a plate 37 rigidly projecting from the cover 7. The plate 37 can develop according to a vertical plane and project from the cover 7, in order to interact with corresponding electric contacts provided in the beverage producing machine 3, as will be described in greater detail later on.

Figure 8:
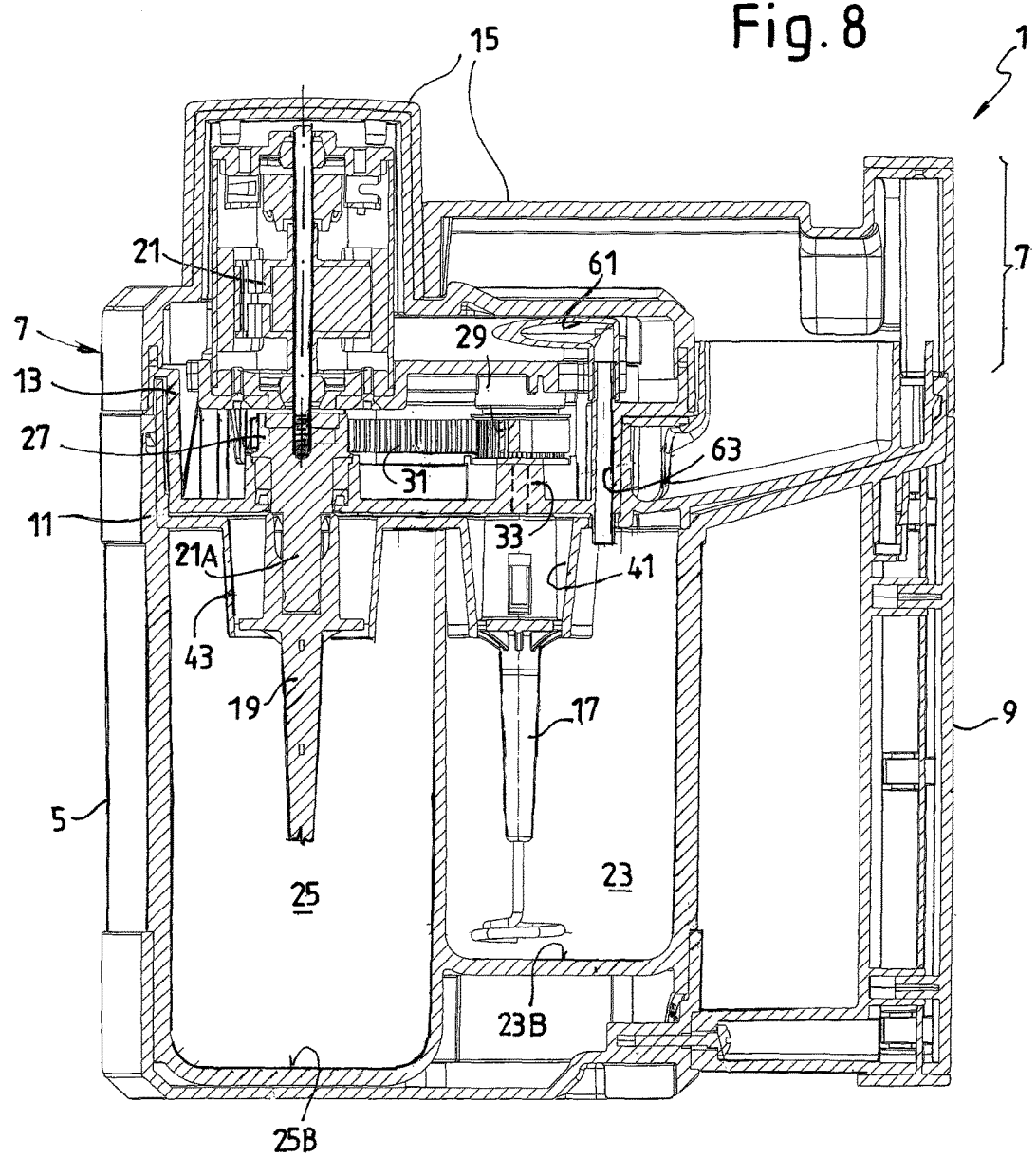

As can best be seen in FIG. 8 the stirrers 17 and 19 extend through passages 41 and 43 provided in the bottom portion 11 of the jug cover 7. In this manner, the portion 11 can be engaged on top of the body 5 and the intermediate portion 13 of the jug cover 7 can be removed from the jug body 5.

The intermediate portion 13 of the jug cover 7 has a front projection or nose 45 projecting from the intermediate portion 13 and arranged on the side of the jug opposite the handle 9 when the cover 7 is placed on top of the jug body 5. The nose 45 is configured and arranged for connection to the beverage producing machine 3.

The nose 45 can be provided with side pins 47 engaging in corresponding slots or guide channels 49 provided in a recess 3A (FIG. 4) in the front panel 3B of the beverage producing machine 3.

Figure 4:
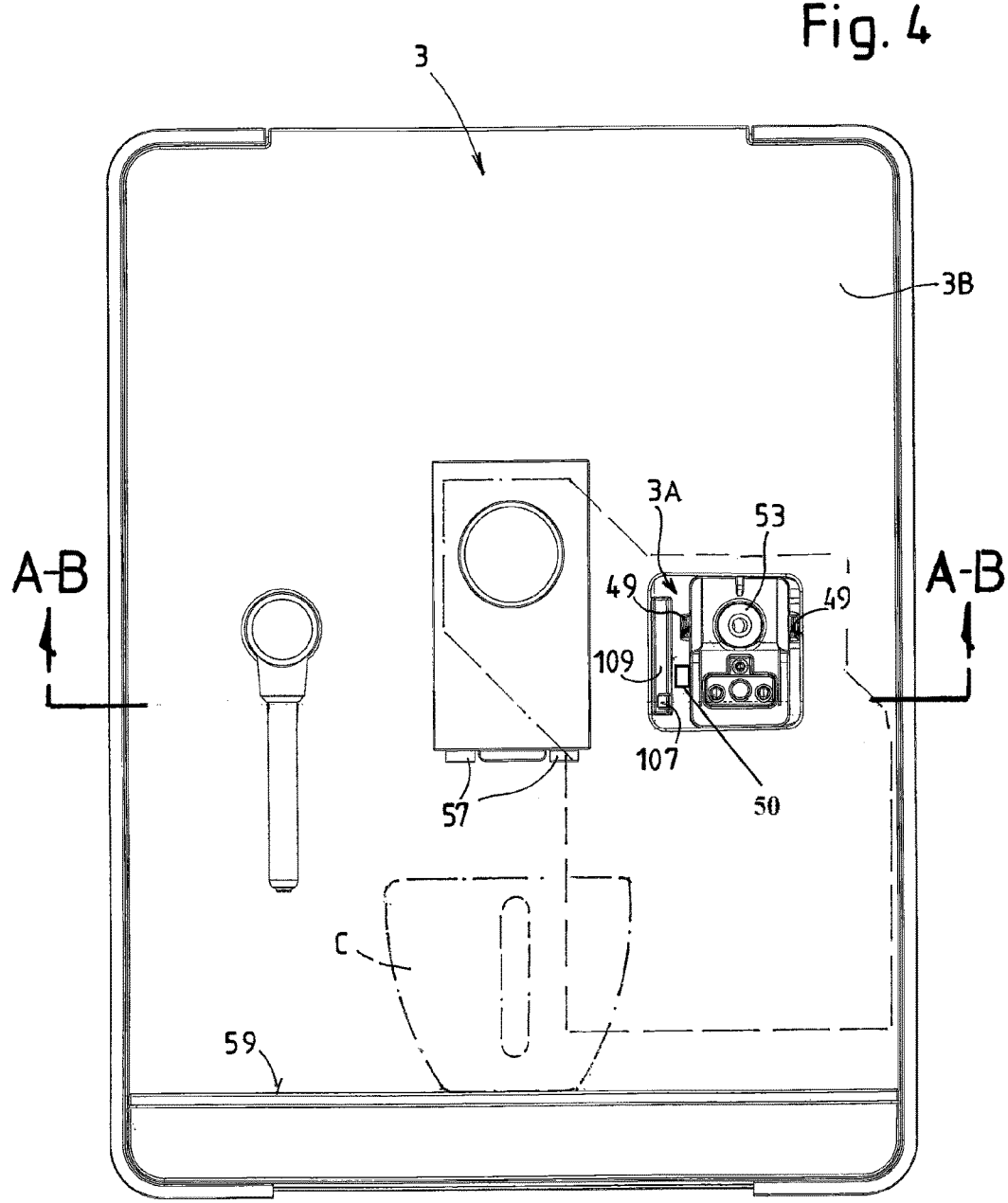
FIG. 4 illustrates a front view of the machine of FIG. 3.

A connector, for example a male connector 51 extends frontally from the nose 45 and is designed for co-action to a connector 53, for example a female connector, housed in the above mentioned recess 3A provided in the front panel 3B of the beverage producing machine 3 (FIG. 4). In other embodiments, connector 51 can be a female connector, co-acting with a male connector 53.

As will be explained in greater detail later on, the connector 51 forms a first connection intended for receiving a beverage produced by a beverage producing unit schematically shown at 55 arranged in the beverage producing machine 3. The beverage producing unit 55 is connected to a hydraulic circuit which is designed so that the beverage can be selectively dispensed through the female connector 53 in the male connector 51, or through the beverage spouts 57 supported by the front panel 3B of the beverage producing machine 3 and arranged above a drip tray 59, on which a cup C can be placed for collecting the beverage directly from the dispensing spout 57. The beverage producing unit 55 can be for instance a coffee brewing unit for the production of espresso coffee, or for producing other beverages.

Figure 9:
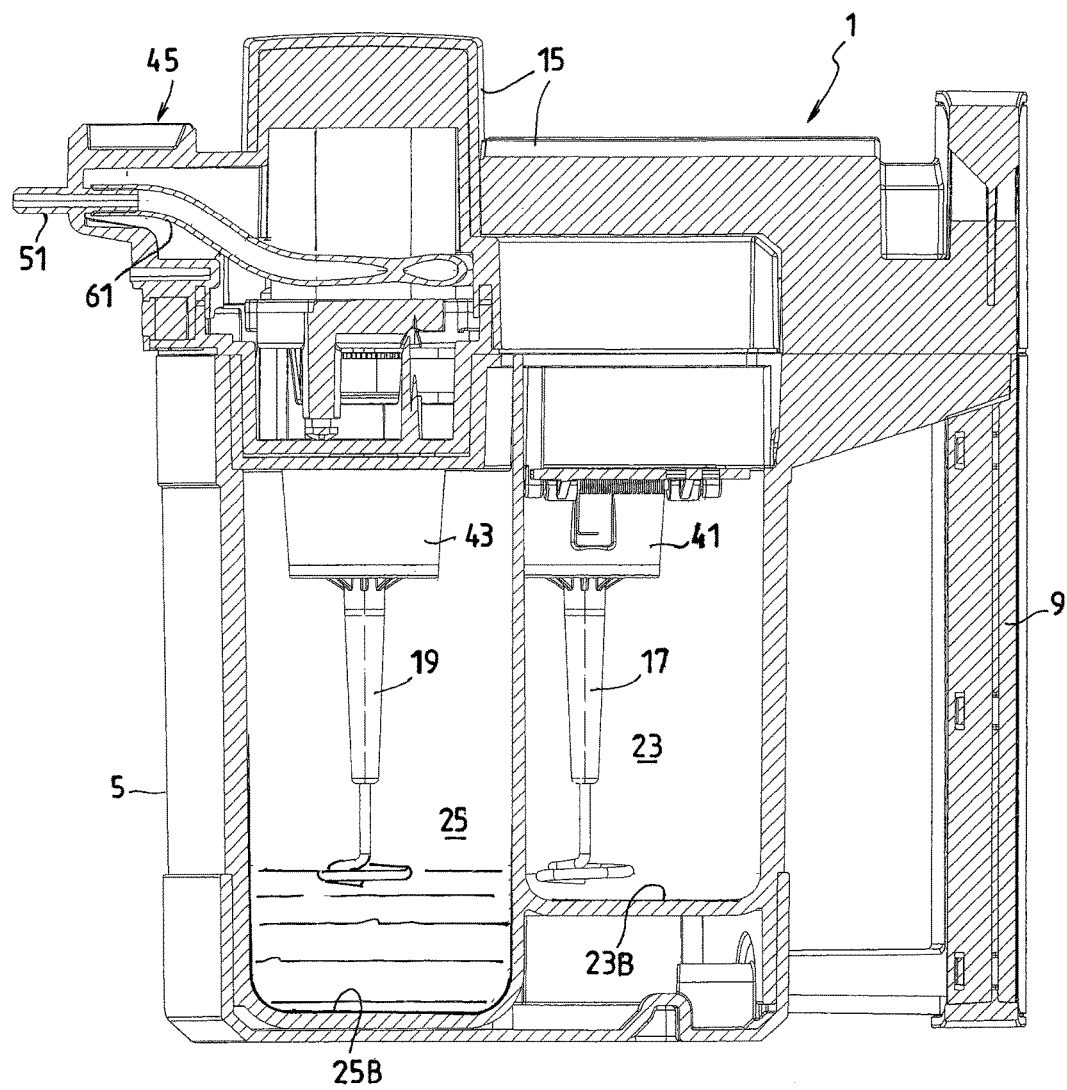
Figure 10:
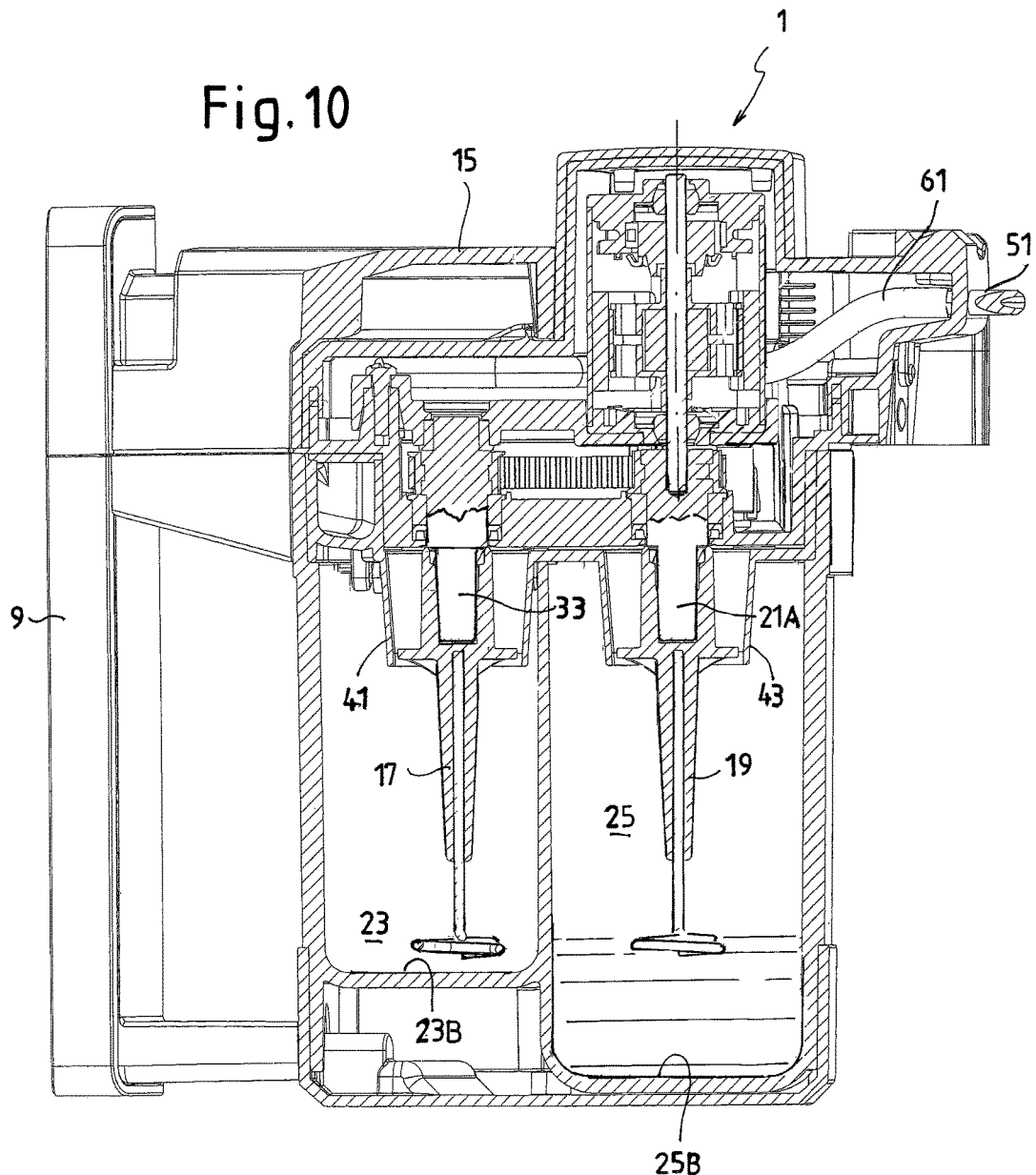

The male connector 51 supported frontally on the nose 45 is in fluid communication with a pipe 61 arranged in the jug cover 7, as shown in particular in FIG. 9. In some embodiments, the pipe 61 can be housed in the intermediate portion 13 of the cover 7 and extend from the connector 51 towards a second connector 63 (see in particular FIG. 8) formed by the intermediate portion 13 of the cover 7. The connector 63 opens in the first receptacle 23, so that a beverage, for example coffee, produced by the beverage producing machine 3, can be dispensed through the female connector 53, the male connector 51, the pipe 61 and the second connector 63 directly in the first receptacle 23.

One or more additional or alternative ingredients for the preparation of beverages can be introduced in the first receptacle 23 through an aperture provided in the jug cover 7. In some embodiments, as can best be seen in FIG. 2, the intermediate portion 11 of the cover 7 can form a through passage 65, which, when the cover 7 is placed on top of the body 5, is located above the first receptacle 23. The through passage 65 formed by the intermediate portion 13 of the cover 7 is aligned to a second through passage 67 formed by the lower portion 11 of the cover 7. The through passages 65, 67 are closed by the upper portion 15 of the cover 7 when the entire cover 7 is assembled and placed on top of the body 5 of the jug 1. By removing the top portion 15, access to the first receptacle 23 can be obtained through the passages 65, 67.

The large aperture formed by the passages 65, 67 can be used, for example, to introduce ice cubes or the like in receptacle 23.

In preferred embodiments a movable apertured wall 69 is pivotally supported by the lower portion 11 of the cover 7. The apertured wall 69 can be tilted according to double arrow f69 and is elastically biased by a resilient member, for example a biasing spring 71, towards the rest position shown in FIG. 2, i.e. a position in which said apertured wall 69 partly closes the through passages 65, 67. By pushing the apertured wall 69 from the top inwardly, the apertured wall 69 pivots according to arrow f69 to allow the introduction of ice cubes or the like in the receptacle 23. When located in the rest position, the apertured wall 69 prevents large ice pieces from being poured out of the receptacle 23, thus facilitating the preparation of iced beverages, for example ice coffee.

Ice cubes introduced in the receptacle 23 along with hot coffee dispensed by the beverage producing machine 3 through pipe 61 can be used to produce ice coffee by rotating the stirrer 17 and thus breaking the ice cubes or melting the ice cube and cooling the hot coffee dispensed by the beverage producing machine 3. In some embodiments, the beverage producing machine 3 can be configured so that a less hot coffee can be dispensed when the user wishes to prepare a cold or ice coffee, so that cooling the coffee by crushing or melting ice cubes becomes more effective.

In some embodiments a stirrer 17 can be used having a shape suitable for crushing the ice cubes. For example the stirrer 17 can be provided with blades. However, this is not mandatory. A differently shaped stirrer can be envisaged, the structure whereof is designed and configured to mix the liquid beverage and the ice cubes therein, to promote or accelerate melting of the ice by improving heat exchange between the hot beverage, such as coffee, and the ice cubes. Less power is required to rotate the stirrer 17. Moreover, a stirrer can be used in this case, which is also suitable for other operations, e.g. for milk frothing. Two identical stirrers 17, 19 can thus be provided in the two receptacle, making the use of the device easier, as noted above.

In some embodiments the jug body 5 is advantageously provided with a double pouring lip 73. The double pouring lip 73 is closed by the upper portion 15 of the cover 7 when the entire cover 7 is assembled and placed on top of the jug body 5. For this purpose, the upper portion 15 of the cover 7 is provided with a side extension 15A (see FIGS. 1 and 2). By removing the upper portion 15 of the cover 7, the first receptacle 23 can be accessed and the beverage can be poured from the jug 1 in a cup, a glass, or the like, for example.

As can be best appreciated from FIG. 2, in some embodiments the pouring lip 73 is provided with an intermediate partition wall 75, which divides the pouring lip in two portions 73A and 73B. A beverage contained in the receptacle 23 is poured through the portion 73A of the pouring lip 73, while a beverage contained in the second receptacle 25 of the jug 1 is poured through the portion 73B of the pouring lip 73. It is thus possible to pour two different beverages prepared simultaneously in the two receptacles 23 and 25 of the jug 1, keeping the two beverages separate until they are poured from of the jug. This is particularly advantageous e.g for preparing cold cappuccino. Frothing of cold milk with stirrer 19 in a separate receptacle, keeping the hot coffee and the ice in the other receptacle results in more efficient frothing and better quality of the final product.

Providing a double pouring lip 73 makes dispensing of the two parts (frothed milk and cold coffee) in a cup, for instance, easier and more user-friendly.

In other embodiments, two separate pouring lips can be provided, one for each of the two receptacles of the jug. Such arrangement will make a double pouring operation necessary, however.

In some embodiments the beverage producing machine 3 can be provided with one or more steam and/or water dispensing nozzles located in the recess 3A (FIG. 4). The steam and/or water dispensing nozzle(s) can be connected to the jug 1 through a corresponding apertures provided in the nose 45. In the embodiment illustrated in the drawings, the jug 1 is designed for connection to only one such steam/water nozzle. For this purpose the nose 45 is provided with a top aperture 77 (see FIG. 5) forming part of a connection towards the second receptacle 25. A steam and/or hot water dispensing nozzle can be introduced into the aperture 77 according to a vertical or nearly vertical direction, to put the jug 1 in fluid communication with the steam and/or hot water circuit of the beverage producing machine 3. In other embodiments, insertion of the dispensing nozzle can be in a horizontal or in an inclined direction.

Figure 6:
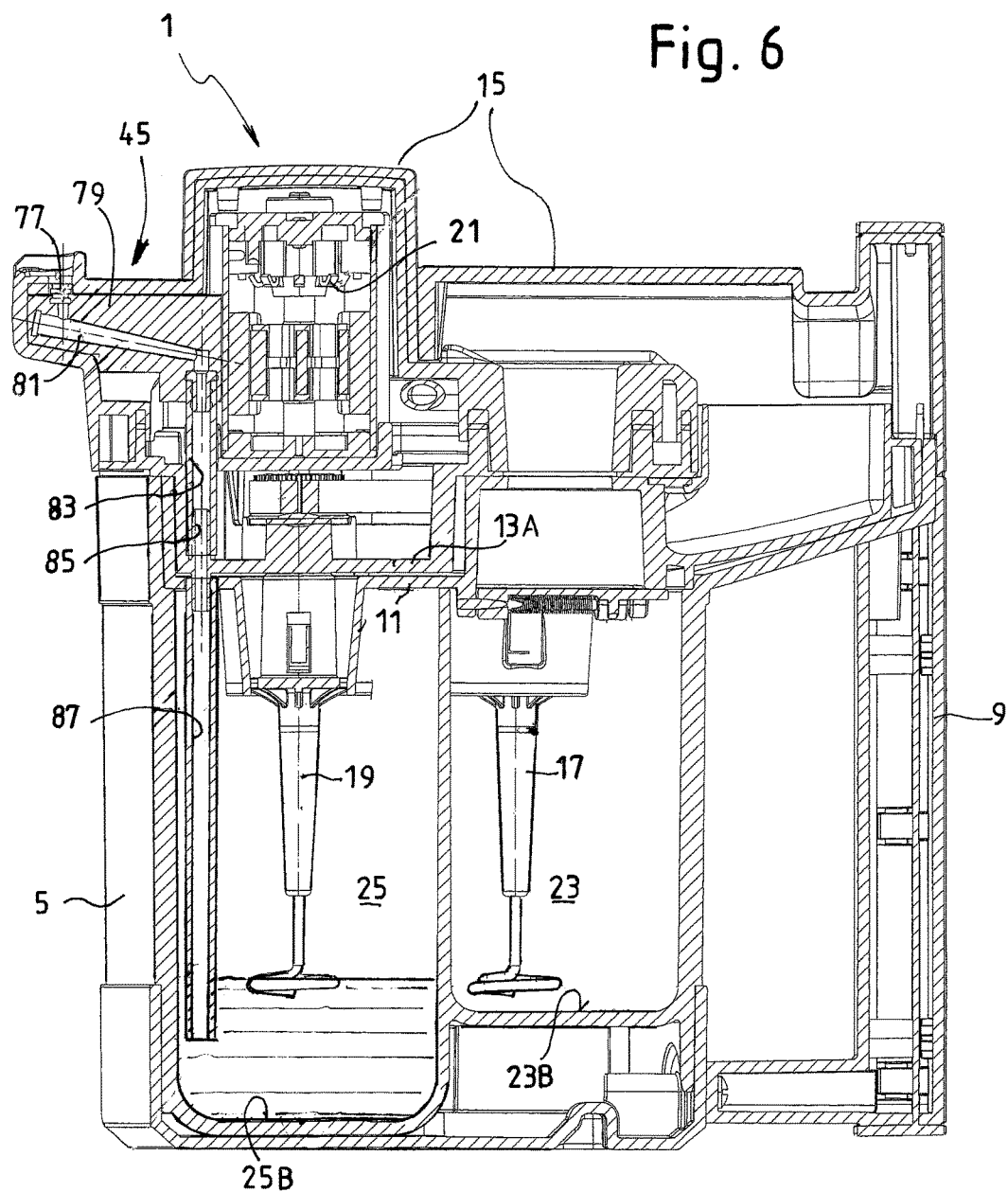
FIGS. 6, 7, 8, 9 and 10 illustrate cross-sections according to lines VI-VI, VII-VII, VIII-VIII, IX-IX and X-X in FIG. 5.
Figure 7:
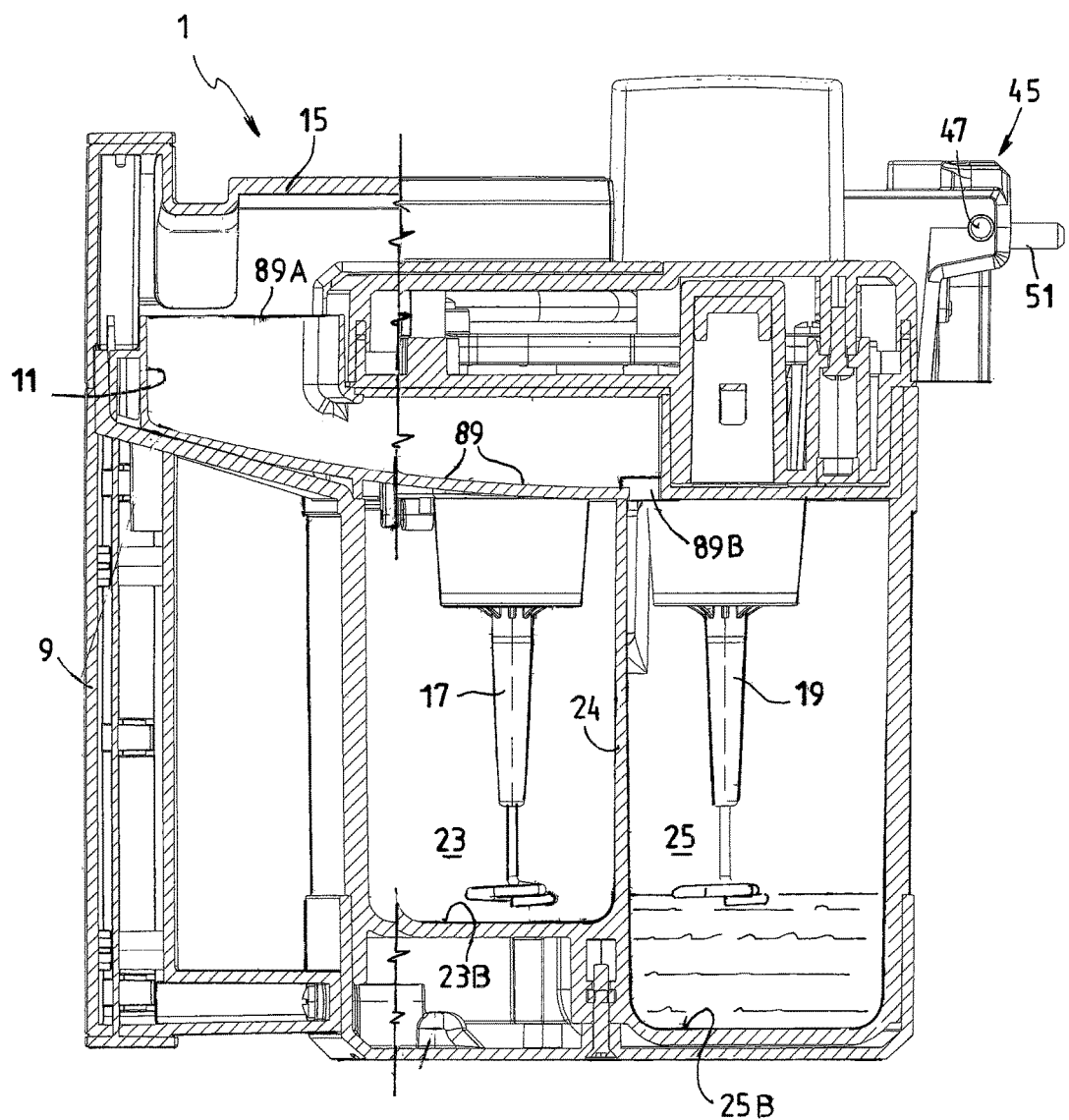

As best shown in FIG. 6, in some embodiments inside the nose 45 a member 79 is housed, which has a steam and/or hot water pathway 81 formed therein. The steam and/or hot water pathway 81 is in fluid communication with the aperture 77 provided in the top portion of the nose 45. The steam and/or hot water pathway 81 is in turn in fluid communication with a tube 83 arranged in the intermediate cover portion 13. The tube 83 can be further connected to a connector 85 extending through a bottom wall 13A of the intermediate cover portion 13 and provides a flow passage from the tube 83 to a further tube or pipe 87. The tube or pipe 87 extends downwardly through a passage formed in the lower portion 11 of the cover 7 towards the bottom 25B of the second receptacle 25. As shown in FIG. 6, the pipe 87 can extend downwardly almost to the bottom 25B of the receptacle 25.

The pipe 87 can be constrained to the connector 85 and be removed therewith when the intermediate cover portion 13 is removed from the lower cover portion 11. Alternatively the pipe 87 can be constrained to the lower cover portion 11 and remain attached thereto when the connector 85 is removed along with the intermediate cover portion 13.

With this arrangement hot water or steam can be dispensed in the second receptacle 25. Additional ingredients can be charged in the second receptacle 25 through a sort of race or channel formed in the cover 7 and best shown when looking at FIGS. 7 and 8. The channel is labeled 89 and is formed in the lower cover portion 11. The channel 89 has a channel inlet aperture 89A. This aperture can be arranged on top of the handle 9 and extend with a slight inclination over the horizontal reaching a lower output end aperture 89B arranged on top of the second receptacle 25. The channel 89 can be closed by the upper cover portion 15. When the upper cover portion 15 is removed from the remaining intermediate and lower cover portions 13 and 11, access to the channel 89 through inlet aperture 89A is obtained. An ingredient, for instance and preferably a liquid ingredient, such as milk, can be poured through aperture 89A and channel 89 into the second receptacle 25.

The second receptacle 25 can be used, for example, to produce hot or frothed milk. For this purpose cold milk can be poured in the second receptacle 25 through channel 89. Once the milk has been introduced in the receptacle 25, the top cover portion 15 can be replaced in its closed position (FIG. 7) and the jug can be put in fluid communication with a steam generator (not shown) arranged in the beverage producing machine 3 through the steam and/or hot water pathway 81 and the aperture 77 provided in the nose 45. If steam is dispensed through the passageway 81, the milk contained in the second receptacle 25 can be heated. If the stirrer 19 is driven into rotation, the milk can be frothed. Hot frothed milk is thus obtained. If no steam is dispensed and the stirrer 19 is put into rotation, cold frothed milk is produced.

In preferred embodiments the second receptacle 25 is deeper than the first receptacle 23, so that the lower part of the stirrer 19 is arranged at a distance from the bottom of the receptacle 25. When frothed milk is desired, the amount of milk introduced in the receptacle 25 is such as to reach the lower part of the stirrer 19. Rotation of the stirrer will thus force air into the milk and produce milk froth. By providing receptacles 23, 25 having different depths, two identical stirrers 17, 19 can be provided, to perform two different functions, depending upon the position of the stirrer with respect to the liquid level and to the bottom of the respective receptacle 23, 25.

By dispensing hot water through the pathway 81 into the second receptacle 25, a hot beverage, for example tea or instant coffee can be produced with the same jug.

Figure 4A:
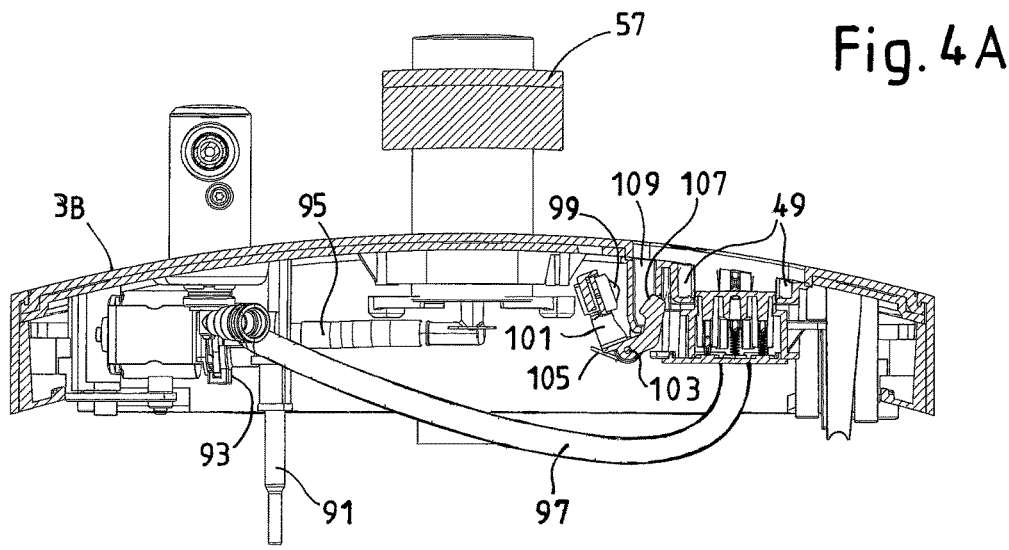
FIG. 4A illustrates a cross-section of the front panel of the machine of FIGS. 3 and 4 according to line AB-AB in FIG. 4 with the jug removed.
Figure 4B:
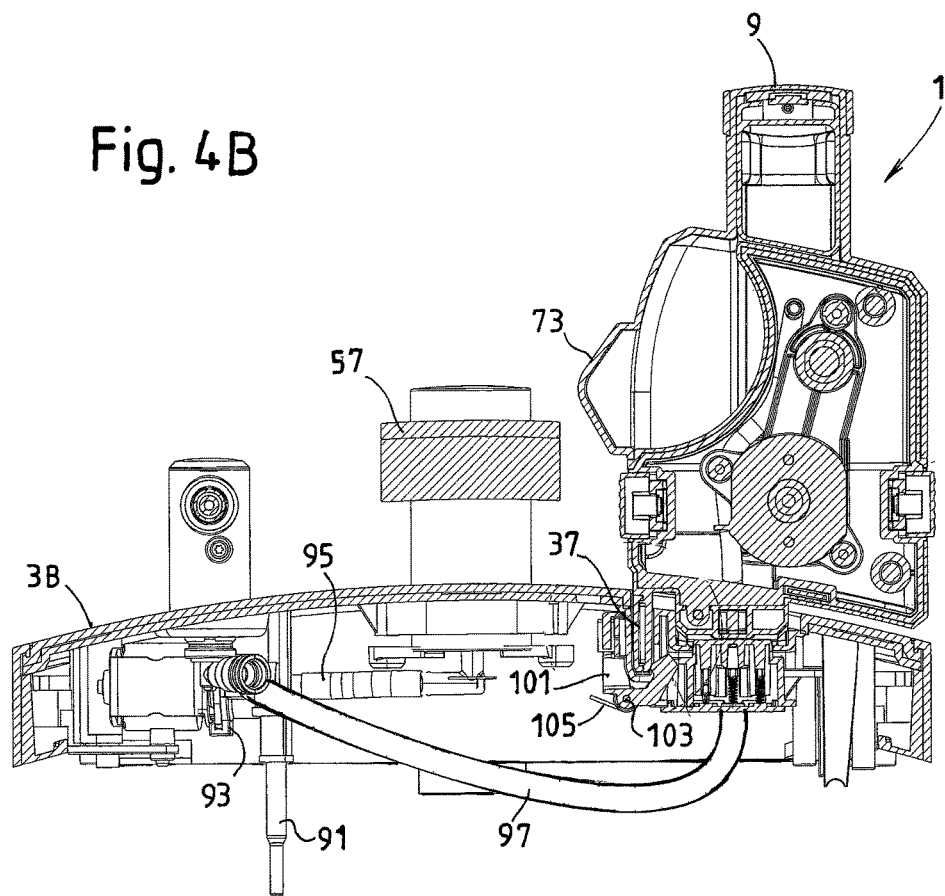
FIG. 4B illustrates the same cross-section of FIG. 4A, with the jug connected to the beverage producing machine.
Figure 5:
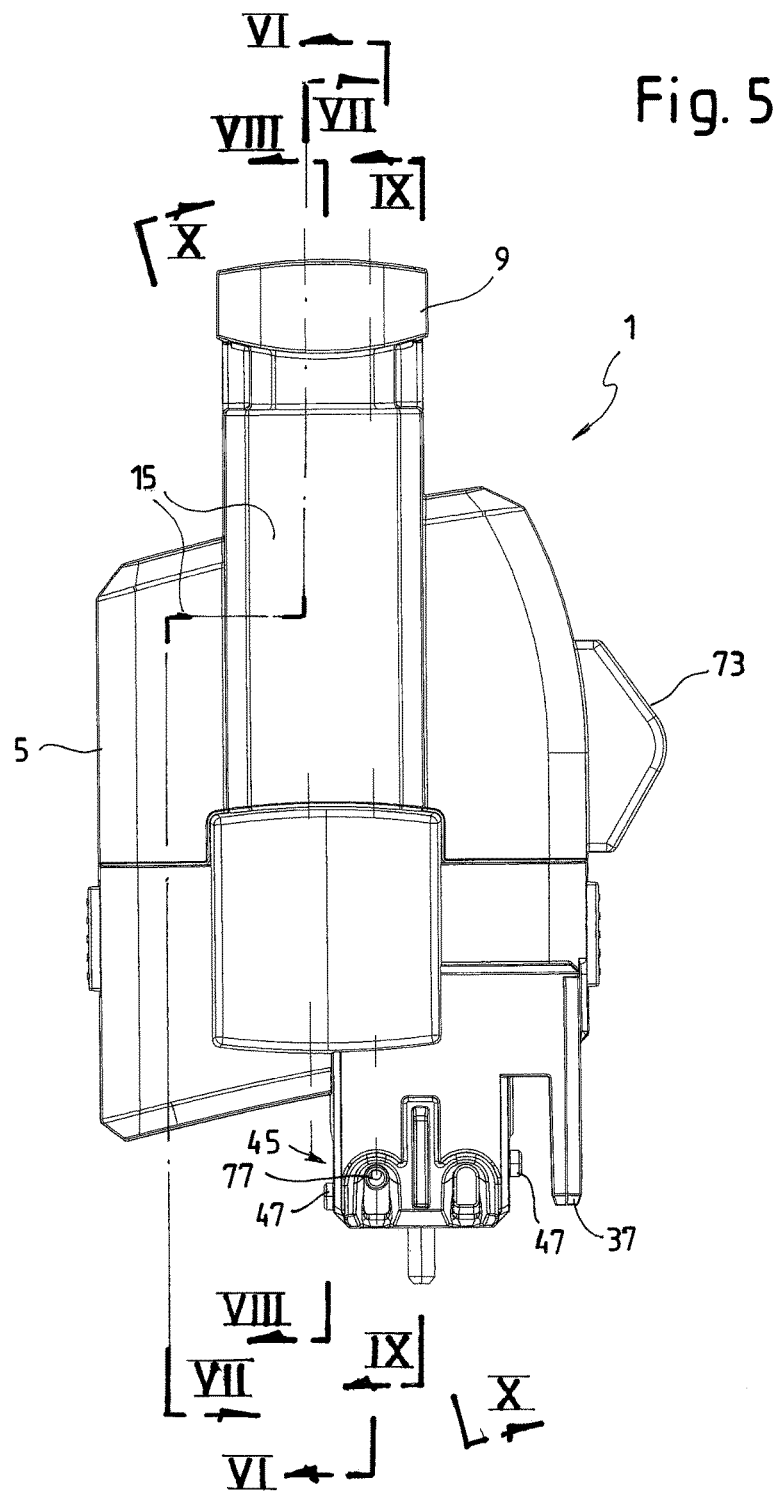
FIG. 5 illustrates a top view of the jug of FIGS. 1 and 2.

FIGS. 4, 4A and 4B illustrate a possible way of designing the coupling between the jug 1 and the beverage producing machine 3. FIGS. 4A and 4B illustrate a cross-section along line AB-AB of FIG. 4 of the front panel 3B of the beverage producing machine 3 with the jug removed (FIG. 4A) and the jug attached to the machine (FIG. 4B).

In FIGS. 4A and 4B reference number 91 designates a tube provided for connection to the beverage producing unit 55, for example a coffee brewing unit. The tube 91 is in fluid communication alternatively and selectively with the dispensing spout 57 or the female connector 53. To this end the tube 91 can be connected to a three-way electro-valve 93, which can put the tube 91 in communication with a first hose 95 or a second hose 97, selectively.

When the tube 91 is in communication via valve 93 with the first hose 95, the beverage produced by the beverage producing unit 55 is dispensed through the spout 57, for example directly in a cup C placed on the drip tray 59 (FIGS. 3 and 4).

When the tube 91 is put in communication via valve 93 with the second hose 97, the beverage produced by the beverage producing unit 55 is dispensed through the female connector 53 to the jug 1. To this end the jug must be properly connected to the machine as shown in FIGS. 3 and 4B. A micro-switch, or any other kind of sensor 50 can be provided to detect the proper connection of the jug 1 to the beverage producing machine 3, thus enabling switching of the electro-valve 93 in a position where the tube 91 is put into fluid communication with the hose 97. If the jug 1 is not properly connected to the machine 3, the sensor will inhibit switching of the electro-valve 93 in this condition and dispensing of the beverage will only be possible through the first hose 95 and the spout 57.

FIGS. 4A and 4B also show how electrical connection is achieved between the jug 1 and an electric circuit arranged in the housing of the beverage producing machine 3. In this embodiment inner electric contacts 99 are supported on a pivoting arm 101, which is hinged at 103 to the front panel 3B of the beverage preparing machine 3. A resilient member, for example a spring 105 can be provided for biasing the pivoting arm 101 towards a rest position shown in FIG. 4A. The pivoting arm 101 can be provided with an appendage 107. When the arm 101 is in the rest position, the appendage 107 projects inside a seat 109 accessible from the outside of the machine housing. The appendage 107 projects in the seat 109 when the jug 1 is not attached to the beverage producing machine 3, as shown in FIG. 4A.

When the jug 1 is connected to the beverage producing machine 3, the plate 37 enters the seat 109 and pushes the appendage 107 out of said seat, causing the arm 101 to pivot around axis 103 until the inner electric contacts 99 project through suitable slots into the seat 109. The contacts 35 provided on the plate 37 will thus be pressed against the inner electric contacts 99 and the electric and/or electronic components onboard of the jug 1, for example the electric motor 21, can thus be energized and powered.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A beverage producing machine for preparation of beverages comprising:
    a beverage connector; and
    a jug including:
        a body with a first receptacle and a second receptacle configured to receive ingredients for the preparation of beverages, wherein the first receptacle and the second receptacle have different depths, one of said first receptacle and said second receptacle having a larger depth than the other;
        a first stirrer and a second stirrer, wherein the first stirrer is provided for arrangement in the first receptacle and the second stirrer is provided for arrangement in the second receptacle, and wherein the first stirrer and the second stirrer are provided to perform different functions based on the depths of the said first receptacle and said second receptacle;
        a cover configured to close the body;
        a first fluid connector configured to connect the first receptacle of the jug to the beverage connector of the beverage producing machine for receiving a beverage from the beverage producing machine and collecting the beverage in the first receptacle; and
        a second fluid connector configured to connect the second receptacle of the jug to the beverage producing machine for providing fluid communication between the beverage producing machine and the second receptacle.

2. The beverage producing machine according to claim 1, wherein the second fluid connector is further configured to receive at least one of hot water and steam from the beverage producing machine.

3. The beverage producing machine according to claim 1, wherein the first stirrer and the second stirrer are supported by the cover.

4. The beverage producing machine according to claim 1, further comprising a channel for introducing a liquid in one of said first receptacle and said second receptacle through one of said first fluid connector and said second fluid connector.

5. The beverage producing machine according to claim 4, wherein the channel is configured to introduce the liquid in the second receptacle.

6. The beverage producing machine according to claim 4, wherein the channel is formed in the cover, and wherein said cover comprises a removable upper portion closing an inlet aperture of said channel.

7. The beverage producing machine according to claim 1, wherein the body comprises a pouring lip, the pouring lip being configured to pour a beverage from both the first receptacle and the second receptacle, and
    wherein the pouring lip is provided with an intermediate partition wall, the intermediate partition wall dividing the pouring lip in a first portion and a second portion, the first portion and the second portion being arranged for receiving the beverage from the first receptacle and the second receptacle, respectively.

8. The beverage producing machine according to claim 1, wherein the first stirrer and the second stirrer are driven in rotation by an electric motor arrangement provided on said jug.

9. The beverage producing machine according to claim 1, wherein the cover comprises: a lower portion, engageable to the body of the jug, an intermediate portion, engageable to and disengageable from the lower portion, said intermediate portion supporting the first stirrer and the second stirrer, and an upper removable portion having a side extension configured to close a pouring lip of the body when the upper removable portion is located over the intermediate portion.

10. The beverage producing machine according to claim 1, further comprising:
    a valve configured to fluidly connect the jug to the beverage producing machine in a first position, and fluidly connect the beverage producing machine to a spout in a second position for dispensing the beverage through the spout directly in a cup; and
    a sensor configured to detect connection of the first fluid connector of the jug to the beverage connector of the beverage producing machine, enable switching of the valve to the first position in response to detecting the connection of the jug to the beverage producing machine and inhibit the switching of the valve to the first position in response to detecting absence of the connection of the jug to the beverage producing machine.

11. The beverage producing machine according to claim 10, wherein the valve is switched to the second position when the sensor does not detect the connection of the jug to the beverage producing machine.

12. A jug for preparation of beverages comprising:
    a body with a pouring lip, the body having at least a first receptacle and a second receptacle for receiving ingredients for the preparation of beverages;
    a first stirrer provided for arrangement in the first receptacle;
    a second stirrer provided for arrangement in the second receptacle;
    a cover closing the body, the cover including three portions including an upper portion covering an intermediate portion and a lower portion including a channel having a channel opening, the upper portion having a side extension configured to close the pouring lip of the body, the upper portion closing the channel opening of the lower portion;
    a first fluid connection arranged for receiving a beverage from a beverage producing machine and collecting the beverage in the first receptacle; and a second fluid connection to the beverage producing machine, in fluid communication with the second receptacle, wherein the first receptacle and the second receptacle have different depths, one of said first receptacle and said second receptacle having a larger depth than the other, wherein the first stirrer and the second stirrer are provided to perform different functions based on the depths of the said first receptacle and said second receptacle, and wherein the first stirrer and the second stirrer are supported by the intermediate portion of the cover located between the lower portion and upper portion of the three portions.

13. A jug for preparation of beverages comprising:

a body with a pouring lip, the body having at least a first receptacle and a second receptacle for receiving ingredients for the preparation of beverages;

a first stirrer provided for arrangement in the first receptacle;

a second stirrer provided for arrangement in the second receptacle;

a cover closing the body, the cover including three portions including an upper portion covering an intermediate portion and a lower portion including a channel having a channel opening, the upper portion having a side extension configured to close the pouring lip of the body, the upper portion closing the channel opening of the lower portion;

a first fluid connection arranged for receiving a beverage from a beverage producing machine and collecting the beverage in the first receptacle; and a second fluid connection to the beverage producing machine, in fluid communication with the second receptacle, wherein the first receptacle and the second receptacle have different depths, one of said first receptacle and said second receptacle having a larger depth than the other, wherein the first stirrer and the second stirrer are provided to perform different functions based on the depths of the said first receptacle and said second receptacle, and wherein the first stirrer and the second stirrer are driven in rotation by an electric motor arrangement provided on said jug in the intermediate portion of the cover that closes the body located between the lower portion and upper portion of the three portions.

14. The jug according to claim 13, wherein the electric motor arrangement is supported by the cover.

15. The jug according to claim 14, wherein the electric motor arrangement comprises a single electric motor driving into rotation both the first stirrer and the second stirrer.

16. A jug for preparation of beverages comprising:

a body with at least a first receptacle and a second receptacle for receiving ingredients for the preparation of beverages;

a first stirrer provided for arrangement in one of the first receptacle and the second receptacle;

a cover closing the body;

a first fluid connection arranged for receiving a beverage from a beverage producing machine and collecting the beverage in the first receptacle; and a second fluid connection to the beverage producing machine, in fluid communication with the second receptacle, wherein the first receptacle and the second receptacle have different depths, one of said first receptacle and said second receptacle having a larger depth than the other, wherein the first stirrer is provided to perform different functions based on the depths of the said first receptacle and said second receptacle, wherein the body comprises a pouring lip, the pouring lip being arranged and configured for pouring a beverage from both the first receptacle and the second receptacle, wherein the pouring lip is provided with an intermediate partition wall, the intermediate partition wall dividing the pouring lip in a first portion and a second portion, the first portion and the second portion being arranged for receiving the beverage from the first receptacle and the second receptacle, respectively, wherein the cover comprises: a lower portion including a channel having a channel opening, engageable to the body of the jug, an intermediate portion, engageable to and disengageable from the lower portion, said intermediate portion supporting the first stirrer, and an upper removable portion configured to cover the intermediate portion and the lower portion, the upper removable portion having a side extension extending from a side of the upper removable portion and being configured to close the pouring lip of the body when the upper removable portion is located over the intermediate portion, and wherein the upper removable portion closes the channel opening of the lower portion.

17. A jug for preparation of beverages comprising:

a body with at least a first receptacle and a second receptacle for receiving ingredients for the preparation of beverages;

a first stirrer provided for arrangement in one of the first receptacle and the second receptacle;

a cover closing the body;

a first fluid connection arranged for receiving a beverage from a beverage producing machine and collecting the beverage in the first receptacle; and a second fluid connection to the beverage producing machine, in fluid communication with the second receptacle, wherein the first stirrer is driven in rotation by an electric motor arrangement provided on said jug in the cover that closes the body, wherein the first receptacle and the second receptacle have different depths, one of said first receptacle and said second receptacle having a larger depth than the other, wherein the first stirrer is provided to perform different functions based on the depths of the said first receptacle and said second receptacle, wherein the cover comprises: a lower portion including a channel having a channel opening, engageable to the body of the jug, an intermediate portion, engageable to and disengageable from the lower portion, said intermediate portion supporting the first stirrer and housing the electric motor arrangement, and an upper removable portion configured to cover the intermediate portion and the lower portion, and wherein the upper removable portion closes the channel opening of the lower portion.

18. A system comprising:
a beverage producing machine comprising:
a beverage producing unit;
a beverage dispenser, arranged for dispensing a beverage in a cup arranged under the beverage dispenser;
a beverage outlet nozzle, arranged for dispensing the beverage in a jug connected to the beverage outlet nozzle;
a switching member, for fluidly connecting the beverage producing unit selectively to one of the beverage dispenser and the beverage outlet nozzle; and
the jug comprising:
- a body with a pouring lip, the body having at least a first receptacle and a second receptacle for receiving ingredients for preparation of beverages;
- at least a first stirrer provided for arrangement in one of the first receptacle and the second receptacle;
- a cover closing the body, the cover including three portions including an upper portion covering an intermediate portion and a lower portion including a channel having a channel opening, the upper portion having a side extension configured to close the pouring lip of the body;
- a first fluid connection arranged for receiving the beverage from the beverage producing machine and collecting the beverage in the first receptacle; and
- a second fluid connection to the beverage producing machine, in fluid communication with the second receptacle;
- wherein the at least first stirrer is driven in rotation by an electric motor arrangement provided on said jug in the intermediate portion of the cover that closes the body located between the lower portion and upper portion of the three portions,
- wherein the first receptacle and the second receptacle have different depths, one of said first receptacle and said second receptacle having a larger depth than the other,
- wherein the at least first stirrer is provided to perform different functions based on the depths of the said first receptacle and second receptacle, and
- wherein the upper portion closes the channel opening of the lower portion.

19. The system according to claim 18, further comprising electric contacts for powering a motor arranged on the jug when the jug is connected to the beverage outlet nozzle, the electric contacts being movable between a recovered position, where the electric contacts are housed inside the beverage producing machine, and an operative position.

20. The system according to claim 19, wherein the electric contacts are arranged on a pivoting arm, said pivoting arm being arranged and configured for co-action with the jug, and wherein when the jug is connected to the beverage outlet nozzle, the electric contacts are in the operative position.

* * * * *